July 5, 1955

HENRI-GEORGES DOLL 2,712,629

ELECTRICAL LOGGING OF EARTH FORMATIONS
TRAVERSED BY A BORE HOLE

Filed March 7, 1951

INVENTOR.
HENRI-GEORGES DOLL
BY
Campbell, Brumbaugh, Free & Graves
HIS ATTORNEYS.

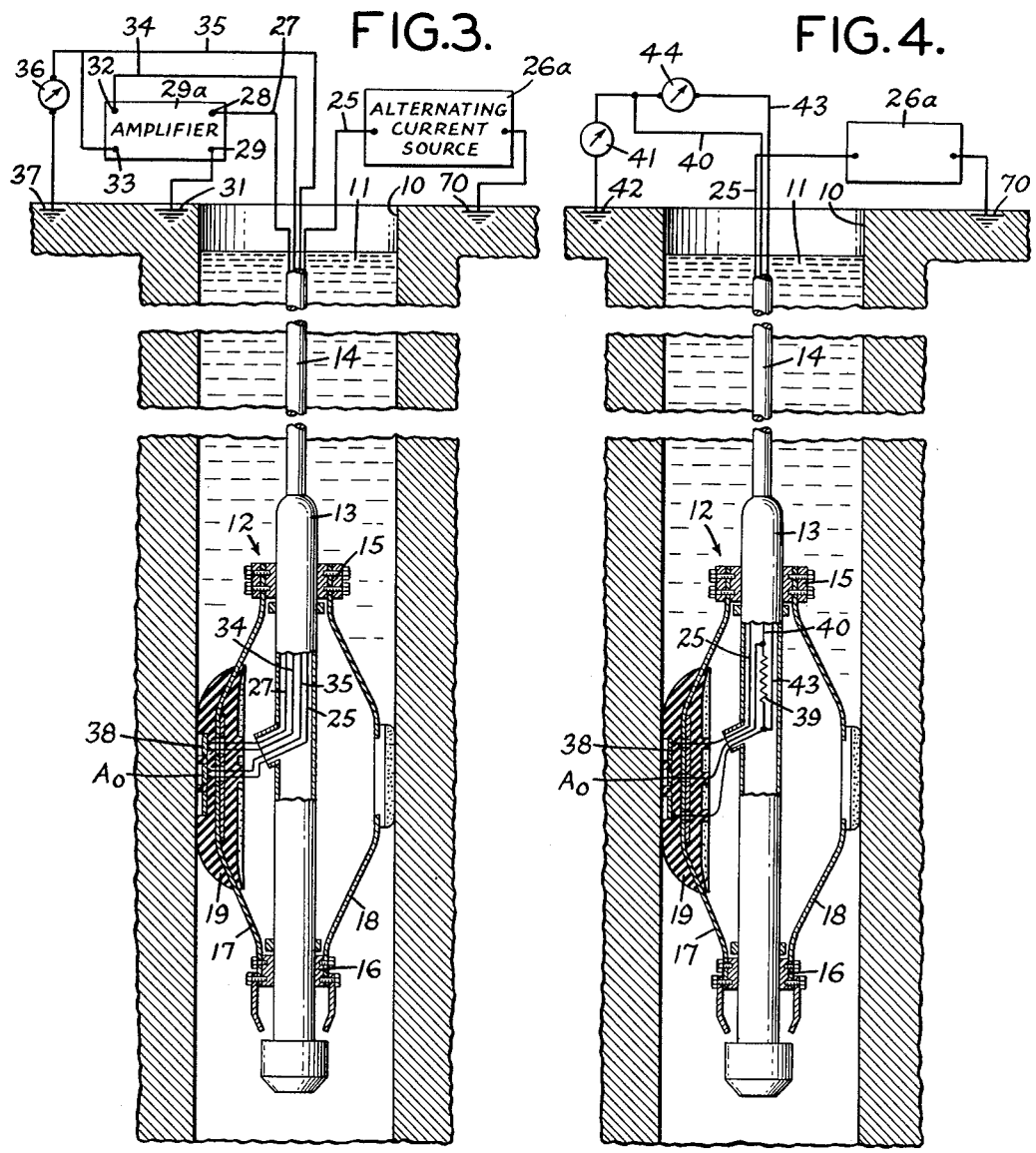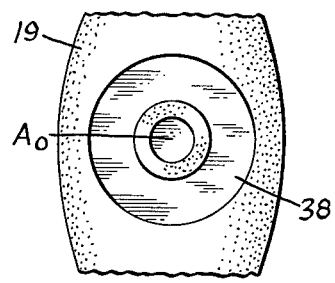

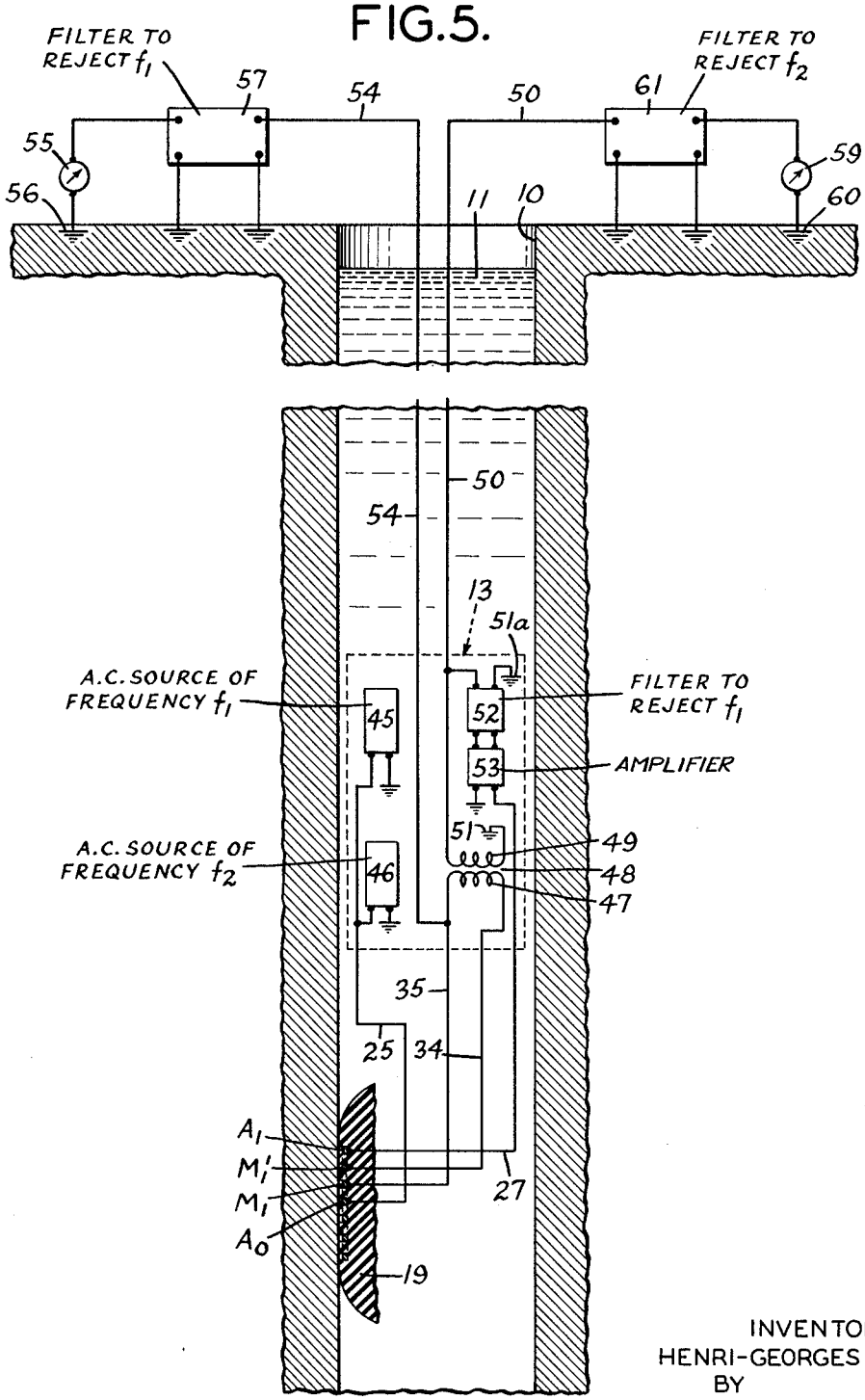

July 5, 1955  HENRI-GEORGES DOLL  2,712,629
ELECTRICAL LOGGING OF EARTH FORMATIONS
TRAVERSED BY A BORE HOLE
Filed March 7, 1951  4 Sheets-Sheet 4

INVENTOR.
HENRI-GEORGES DOLL
BY
HIS ATTORNEYS.

United States Patent Office 2,712,629
Patented July 5, 1955

2,712,629

ELECTRICAL LOGGING OF EARTH FORMATIONS TRAVERSED BY A BORE HOLE

Henri-Georges Doll, Ridgefield, Conn., assignor to Schlumberger Well Surveying Corporation, Houston, Tex., a corporation of Delaware Application March 7, 1951, Serial No. 214,273

13 Claims. (Cl. 324—1)

The present invention relates to well logging operations, and more particularly to new and improved methods and apparatus for making highly localized measurements of the electrical resistivity of the material lying beneath the side wall of a bore hole drilled into the earth.

In the applicant's copending application Serial No. 122,102, filed October 18, 1949, for "Resistivity Method and Apparatus for Obtaining Indications of Permeable Formations Traversed by a Borehole" are disclosed methods and apparatus for simultaneously making highly localized electrical resistivity measurements against the wall of a bore hole. The measurements are respectively indicative of the resistivities at different shallow, lateral depths of investigation, one being approximately equal to the probable thickness of any mud cake on the wall of the bore, and the other being slightly greater so as to include at least part of the adjacent portion of the formation that has been invaded by the drilling mud and mud filtrate. Since the presence of mud cake on the wall of a bore hole is an indication of invasion of the formation by the drilling mud and mud filtrate, i. e., that the formation is permeable, proper interpretation of the measurements so made enables permeable formations to be located in a highly effective manner.

However, since each of these electrical resistivity measurements is affected to a marked degree by the mud cake formed on permeable formations, neither measurement is clearly indicative of the resistivity of the material comprising the invaded zone of the formation lying behind the mud cake. Further, in certain cases the difference in the degree to which the mud cake affects each of the resistivity measurements made as described above, may be small, thus making interpretation of the measurements to determine the location of permeable formations somewhat difficult.

It is an object of the invention, accordingly, to provide new and improved geophysical exploring methods and apparatus whereby highly localized electrical resistivity measurements may be made on the wall of a bore hole which are more truly indicative of the resistivities of invaded zones lying behind mud cake formed on permeable formations.

Another object of the invention is to provide new and improved methods and apparatus for obtaining a localized resistivity measurement against the wall of the bore hole and isolated from the bore hole fluid, which is not appreciably affected by mud cake on the wall of a bore hole.

Another object of the invention is to provide new and improved methods and apparatus for obtaining a highly detailed log of the electrical resistivity of earth formations traversed by a bore hole.

A further object of the invention is to provide new and improved methods and apparatus which produce indications of electrical resistivity in a bore hole that can be more easily interpreted in determining the location of permeable formations.

Still another object of the invention is to provide new and improved methods and apparatus for detecting the presence of mud cake on the walls of the formations traversed by a bore hole.

Yet another object of the invention is to provide new and improved methods and apparatus for obtaining simultaneous indications of electrical resistivity in a bore hole which can be interpreted as denoting either the presence or absence of mud cake on the wall of the bore hole, at least one of said indications representing more nearly the resistivity of the invaded zone lying behind the mud cake.

These and other objects of the invention are attained by disposing at least one principal current emitting electrode in a bore hole and confining the flow of current therefrom to a path extending from the electrode into the wall of the bore hole and generally perpendicularly thereto at least through the mud cake. To this end, the principal electrode is placed in electrical communication with the wall of the bore hole and is insulated from direct electrical contact with any fluid that may be present. Further, the current flow is confined to the desired path by establishing a suitable electric field around the electrode. Specifically, the current confining field may be set up by current from an auxiliary current electrode, the current intensity being preferably adjusted so as to maintain a substantially zero potential difference between spaced apart locations near the principal current emitting electrode.

It has been found that indications of electrical resistivity obtained by observing variations in the potential difference between a point at or near either of the locations between which a zero potential difference obtains and a point at a reference potential approach the resistivity of the invaded zone of a permeable formation. Where the formations are impermeable, the indications obtained approach the true resistivity of the formations. Since the electrode spacing is small, and since the indications obtained approach the actual resistivities of the zones within a short distance from the bore hole, logs obtained in accordance with the invention are highly detailed. Such indications are of considerable utility in determining whether oil or gas may be present in the formations, therefore, since they facilitate the calculation of true formation resistivities.

In a preferred embodiment, means are provided for obtaining, simultaneously with resistivity measurements of the type described above, an electrical resistivity measurement which is appreciably affected by the presence of any mud cake that may be present on the wall of the well. A comparison of the two measurements enables the permeable formations to be located quite readily, since the measurement will be substantially the same for impervious formations where there is no mud cake or invaded zone, but will be different for permeable formations.

The invention may be better understood from the following detailed description of several typical embodiments thereof, taken in conjunction with the accompanying drawings, in which:

Fig. 3 illustrates schematically a modification utilizing only two electrodes against the wall of the bore hole;

Fig. 3A is a front view of the electrode assembly employed in the apparatus of Fig. 3;

Fig. 4 is a schematic diagram of another two electrode system constructed according to the invention;

Fig. 5 is a schematic diagram of another embodiment of the invention; and

Figure 1:
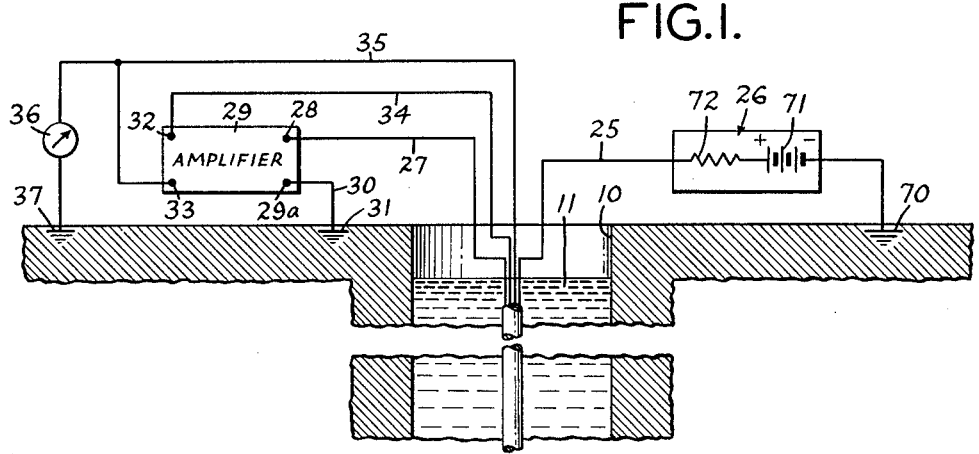
Fig. 1 is a schematic diagram of typical geophysical exploring apparatus constructed in accordance with the invention.

In Fig. 1 is shown a bore hole 10 which contains a column of drilling mud 11 comprising finely divided particles suspended in liquid. Normally the fluid pressure in the permeable formations surrounding the bore hole 10 will be less than that of the drilling mud 11 so that mud and mud filtrate will flow into the permeable formations to a certain depth forming invaded zones therein. These permeable formations will, however, filter the particles in the mud thus leaving a substantial mud cake on the wall of the bore hole at the levels of such formations.

Disposed in the bore hole 10 is a geophysical exploring apparatus 12 which comprises essentially a plurality of electrodes $A_0$, $M_1$, $M_1'$ and $A_1$ embedded in the face of an insulating pad or cushion member 19 together with any suitable means for pressing the latter against the wall of the bore hole. The form of the means used for urging the cushion member 19 against the wall of the bore hole is not at all critical and many devices suitable for this purpose will suggest themselves to those skilled in the art. For example, it may be of the type disclosed in the aforementioned copending application, as shown in Fig. 1, comprising a body 13 suspended on a supporting cable 14. Slidably mounted on opposite ends of the body 13 are a pair of collars 15 and 16 to which are pivotally secured the opposite ends of a plurality of bowed springs 17 and 18 which are continuously urged outwardly towards the wall of the bore hole 10.

The bowed spring 17 carries, intermediate its ends, the pad or cushion member 19 which it presses continuously against the wall of the bore hole 10. The pad 19 may be made of rubber or other flexible insulating material and it conforms generally with the contour of the wall of the bore hole 10. In the outer face of the pad 19 are formed a central circular recess 20 surrounded by a plurality of coaxial annular recesses 21, 22 and 23. Embedded in the recess 20 is the principal current emitting electrode $A_0$ which may be disc-like in shape. The electrode $A_0$ is connected by an insulated conductor 25 in the cable 14 to one terminal of a constant current source 26 at the surface, the other terminal of which may be grounded at the point 70. The source may comprise, for example, a battery 71 and a high impedance 72 in series.

Figure 2:
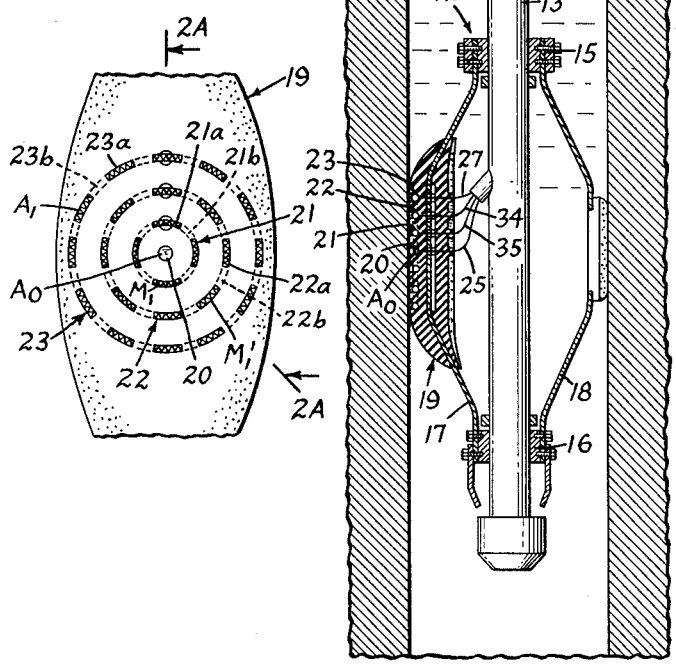
Fig. 2 is a side view of the electrode assembly of the apparatus shown in Fig. 1.
Figure 2A:
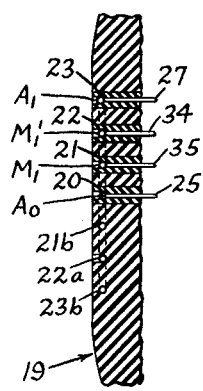
Fig. 2A is a view in longitudinal section taken along line 2A—2A of Fig. 2, looking in the direction of the arrows.

Ideally, each of the electrodes $M_1$, $M_1'$ and $A_1$ should have a continuous exposed surface facing the wall of the bore hole and encompassing the electrode $A_0$. However, because of the difficulties involved in retaining electrodes of this type in the recesses 21, 22 and 23 in the pad 19 as the latter bends to conform to the contour of the bore hole, it is preferred to use a construction of the type shown in Figs. 2 and 2A. In this embodiment, the recesses 21, 22 and 23 may each comprise a plurality of segmental recess portions 21a, 22a and 23a, respectively, connected by tunnel portions 21b, 22b and 23b, respectively, providing communication between adjacent recess portions. Embedded in the recesses 21, 22 and 23 are the concentric electrodes $M_1$, $M_1'$ and $A_1$, respectively, each of which may comprise a helical coil of nichrome wire, say, 1/16 inch in diameter. If desired, segments of the pad 19 lying between the adjacent exposed portions of the electrodes may be made of electrically conducting rubber or other suitable material so as to conform more nearly to the ideal situation.

According to the invention, the current emitted from the electrode $A_0$ is caused to flow subtsantially perpendicularly to the wall of the bore hole 10 by passing current into the formations from the circular electrode $A_1$ of such intensity as to reduce the potential difference between the electrodes $M_1$ and $M_1'$ substantially to zero. To this end, the electrode $A_1$ is connected by a conductor 27 to one output terminal 28 of a conventional amplifier 29, the other output terminal 29a of which is connected by a conductor 30 to ground 31 at the surface of the earth. The input terminals 32 and 33 of the amplifier 29 are connected by the conductors 34 and 35, respectively, to the electrodes $M_1'$ and $M_1$ in the bore hole, as shown. Also, a relatively high impedance potential measuring instrument 36 is connected to the conductor 35 and to ground 37 at the surface of the earth. The instrument 36 provides indications of the potential difference between the electrode $M_1$ in the bore hole and ground 37 at the surface of the earth and it is preferably of the recording type commonly used in electrical logging operations, calibrated to read electrical resistivity directly.

The amplifier 29 is designed to provide a current output which varies in accordance with the voltage input thereto. With the connections described above, therefore, it will be understood that if any potential difference exists between the electrodes $M_1'$ and $M_1$, current will be emitted from the electrode $A_1$ of the proper intensity and sign to reduce that potential difference substantially to zero. Under these conditions, little or no current will flow from the electrode $A_0$ longitudinally along the wall of the bore hole but substantially all of the current from the electrode $A_0$ will flow laterally into the formation essentially in the form of a beam.

As in the case of the method disclosed in the applicant's copending application Serial No. 161,641, filed May 12, 1950, for "Electrical Resistivity Well Logging Method and Apparatus," resistivity values derived from measurements of the potential difference between ground 37 in Fig. 1 and the electrode $M_1$, or any other point in or near the region where the electric field is maintained substantially zero, will be more truly representative of the actual resistivity of the formations through which the current is forced to pass.

Since the electrodes $A_0$, $M_1$, $M_1'$ and $A_1$ are closely spaced, the beam of current from the electrode $A_0$ will not maintain its perpendicularity over a very great depth into the formations before dispersing. However, the lateral extent of the zone through which the current beam is substantially perpendicular will usually be greater than the thickness of the mud cakes ordinarily encountered in field operations. Hence, the low resistivity mud cake will have little effect on the resistivity measurement made by the recording instrument 36.

By employing substantially nonpolarizable, stable electrodes, the electrode $M_1'$ may be used both as a potential electrode and as the auxiliary current electrode by connecting the conductor 27 along with the conductor 34 directly to the electrode $M_1'$. Thus, only three electrodes need be employed, thereby eliminating the electrode $A_1$. Similarly, the electrodes $M_1$ and $A_0$ might be combined by connecting the conductors 25 and 35 to the electrode $A_0$, for example, and omitting the electrode $M_1$.

Figs. 3 and 3A illustrate an embodiment in which only two electrodes are required. In this form of the invention, a principal current emitting electrode $A_0$, which also serves as the electrode $M_1$ of the Fig. 1 embodiment, is embedded in the pad 19. Also, a single annular electrode 38 takes the place of the electrodes $A_1$ and $M_1'$. The electrodes 38 and $A_0$ should be made as unpolarizable as is possible and the electrode $A_0$ is preferably made larger than the corresponding electrode in Fig. 1, as shown in Fig. 3A. The electrode 38 should be as broad as the dimensions of the pad 19 will permit so as to decrease polarization while increasing the focussing effect it has on the current emitted from the electrode $A_0$. As a further aid in minimizing polarization, preferably a constant current, low frequency A. C. source 26a may be employed for the electrode $A_0$, although higher frequencies or D. C. may be employed, if desired.

As shown in Fig. 3, the cable conductors 34 and 27 are both connected to the electrode 38, while the cable conductors 25 and 35 are both connected to the principal current electrode $A_0$. With these connections, it will be understood that the amplifier 29a will supply current of suitable intensity and phase to the electrode 38 to maintain the potential difference between the latter and the electrode $A_0$ substantially at zero. The potential difference between the electrode $A_0$ and ground 37, as measured by the recording instrument 36, will then be accurately representative of the true resistivity of the impervious earth formations, or of the resistivity of invaded zones of permeable formations through which current from the electrode $A_0$ is passed.

Another embodiment of the invention utilizing only two electrodes is shown in Fig. 4. This modification differs from that shown in Figs. 3 and 3A in that a relatively low resistance 39 to say, 0.1 ohm, for example, is connected between the principal electrode $A_0$ and the electrode 38. The electrode 38 is connected by the conductor 25 to the source of alternating current 26a at the surface of the earth, current also being supplied to the principal current electrode $A_0$ through the resistance 39, as shown. The electrode $A_0$ and one end of the resistor 39 are connected by a conductor 40 to one terminal of a high impedance potential indicating instrument 41, the other terminal of which is connected to ground 42 at the surface of the earth. The electrode 38 and the other end of the resistance 39 are connected by a conductor 43 to one terminal of a second potential indicating instrument 44, the other terminal of which is connected to the electrode $A_0$ by the conductor 40.

The ratio between the potential $v$ as measured by the instrument 41 and $\Delta v$ as measured by the instrument 44 is indicative of the electrical resistivity of the earth formation through which the current from the electrode $A_0$ passes. Preferably, the ratio of $v$ to $\Delta v$ is measured directly in units of resistivity. Of course, it is also possible to measure the ratio of $\Delta v$ to $v$, in which case the measurement would preferably be made in units of conductivity. Since a ratio is here being measured, it will be understood that the intensity of the current furnished by the source 26a need not be maintained constant. Preferably, the ratio is measured by any suitable voltage ratio measuring apparatus which may be connected to the conductors 43 and 40 and to the ground 42 at the surface of the earth.

As in the two other embodiments described above, the modification shown in Fig. 4 causes the current emitted by the electrode $A_0$ to pass into the formations as a narrow beam which is substantially perpendicular to the wall of the bore hole for a short distance into the formation. Hence, the indications of electrical resistivity obtained as described above are more accurately representative of the true resistivity of the impervious formations or of the resistivity of invaded zones of permeable formations.

Fig. 5 illustrates a modification of the apparatus shown in Fig. 1 which enables indications of permeable formations to be obtained in accordance with the general technique disclosed in the aforementioned copending application Serial No. 122,102. In this embodiment, alternating currents of frequencies of $f_1$ and $f_2$ are supplied to the electrode $A_0$ from suitable sources 45 and 46 which are preferably disposed within the body 13 (Fig. 1). Electrical energy for the electronic elements contained within the body 13 may be supplied from any suitable power supply (not shown) located either at the surface or within the body 13.

The alternating currents emitted by the electrode $A_0$ establish electric fields of corresponding frequencies which produce corresponding potential differences between the electrodes $M_1$ and $M_1'$. These potential differences are impressed upon the primary winding 47 of a wide band transformer 48, the terminals of the secondary winding 49 of which are connected to a conductor 50 and to ground 51, as shown in Fig. 5. Connected between the conductor 50 and ground 51a is a conventional filter 52 which is designed to discriminate against currents of frequency $f_1$ and to pass currents of frequency $f_2$. The output of the filter 52 is fed to the input terminals of a conventional amplifier 53 which supplies currents of frequency $f_2$ to the electrodes $A_1$. The amplifier 53 is similar to the amplifier 29a in Fig. 3 and it is connected to supply currents of frequency $f_2$ and of proper phase and amplitude to maintain the potential difference of frequency $f_2$ between the electrodes $M_1$ and $M_1'$ substantially at zero.

The electrode $M_1$ is connected by a conductor 54 to one terminal of a high impedance potential indicating instrument 55 at the surface of the earth, the other terminal of which is grounded at 56. A conventional filter 57 designed to discriminate against alternating currents of frequency $f_1$ and to pass alternating currents of frequency $f_2$ is preferably interposed between the conductor 54 and the indicating instrument 55. The potential indicating instrument 55 is preferably of the recording type and it provides a log of the potential difference of frequency $f_2$ between the electrode $M_1$ and ground 56 as a function of the depth of the electrode array in the bore hole.

The output of the secondary winding 49 of the transformer 48, which includes potential differences of frequencies $f_1$ and $f_2$ from the electrode $M_1$ and $M_1'$, is transmitted by the conductor 50 to one terminal of a second potential indicating instrument 59 at the surface, the other terminal of which is grounded at 60. A filter 61 designed to reject alternating currents of frequency $f_2$ and to pass alternating currents of frequency $f_1$ is interposed between the conductor 50 and the indicating instrument 59. The indicating instrument 59 is also preferably of the recording type.

It will be understood that any suitable values may be assigned to the frequencies $f_1$ and $f_2$, including zero frequency (direct current) for one of them. Of course, if direct current is employed, some suitable means other than the transformer 48 would have to be employed for coupling the electrodes $M_1$ and $M_1'$ to the conductor 50. This might be accomplished, for example, by omitting the transformer 48, connecting the conductor 50 to the input terminal of the filter 52 which is now connected to the ground 51a and removing the latter ground, connecting the other terminal of the filter 52 directly to the conductor 35, and connecting the conductor 34 directly to the conductor 50. At the surface of the earth, the terminal of the indicating instrument 59 which is shown grounded at 60 in Fig. 5 should be connected to the output terminal of the filter 61 which is now shown grounded, and the two grounds should be removed. Also, the input terminal of the filter 61 which is now shown grounded should be connected to the cable conductor 54, the ground being removed. If the frequencies selected are so high that the supporting cable induces substantial distortion, it would be preferable to place the filters 57 and 61 in the body 13 and to convert the outputs thereof into direct current or lower frequency signals in any known manner before transmission to the indicating instruments 55 and 59 at the surface of the earth. The instruments 55 and 59 are preferably calibrated directly in units of electrical resistivity, and to this end, the sources 45 and 46 are preferably constant current sources.

In a practical form of the apparatus shown in Fig. 5, the following constants were used: $f_1 = 4750$ cycles per second; $f_2 = 420$ cycles per second; diameter of electrode $A_0 = \frac{1}{4}$ inch; width of electrodes $M_1$, $M_1'$ and $A_1 = \frac{3}{32}$ inch; spacing between electrodes $M_1$ and $A_0 = \frac{9}{16}$ of an inch; spacing between electrodes $M_1'$ and $A_0 = \frac{5}{8}$ of an inch; spacing between electrodes $A_1$ and $A_0 = 1\frac{3}{8}$ of an inch.

It will be understood from the explanation given above in connection with Fig. 1 that the reading obtained by the indicating instrument 55 is indicative of the relatively high resistivity of permeable zones invaded by bore hole fluid. Also, from the aforementioned application Serial No. 122,102 it will be understood that the readings obtained by the indicating instrument 59 are affected appreciably by the relatively low resistivity mud cake on the wall of the bore hole. In order to show the ease with which logs obtained with the apparatus of Fig. 5 may be interpreted, a portion of an actual log obtained in the field is reproduced in Fig. 6.

Figure 6:
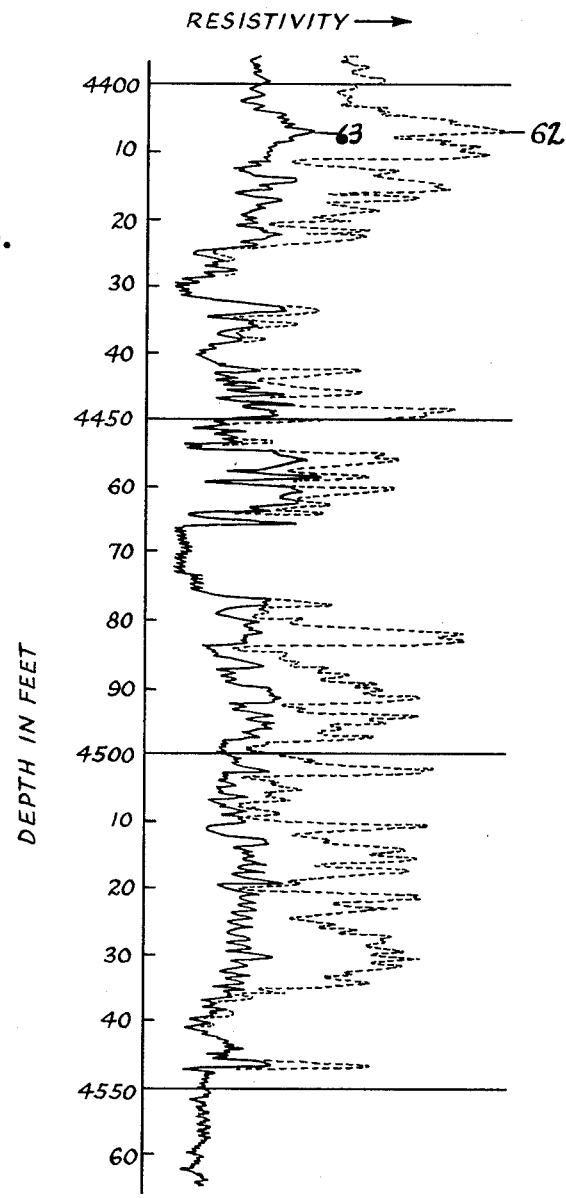
Fig. 6 represents a typical log obtained with apparatus like that shown in Fig. 5.

In Fig. 6, the dashed curve 62 represents a log obtained with the indicating instrument 55, while the curve 63 represents a log obtained simultaneously with the indicating instrument 59, both being plotted as a function of depth. In the sections between approximately 4465' and 4478', between 4535' and 4545' and below 4548', for example, it can be seen that the formations are impervious since the curves 62 and 63 are substantially coincident. If the formations were permeable, the relatively low resistivity mud cake on the formations would make the amplitude of the curve 63 substantially lower than the amplitude of the curve 62 for the same depth, which is indicative of the resistivity of the formations slightly beyond the depth of the mud cake. In the section between approximately 4478' and 4535', for example, the formations are permeable with streaks of impermeable material intersticed therethrough. A permeable streak is indicated between 4545' and 4548', for example. The divergence of the curves shows that the resistivities measured are different and that thus the formations are permeable. The data obtainable from the log shown in Fig. 6 will be of even much greater value when correlated with curves from conventional electrical logging.

From the foregoing, it will be apparent that the invention provides a novel and highly effective method and apparatus for obtaining localized indications of electrical resistivity on the wall of a bore hole that are more accurately representative of the true formation resistivity than has been possible heretofore. Embodied in a system designed in accordance with the general principles disclosed in the aforementioned copending application Serial No. 122,102, the invention enables permeable formations traversed by bore holes to be located in a simple and effective manner.

While the current ground electrodes 70 in Figs. 1, 3 and 4 and the current ground electrodes 31 in Figs. 1 and 3 are shown at the surface, it will be understood that these electrodes may be placed anywhere in the bore hole including the vicinity of the pad 19. Also, the body 13 may serve as ground in place of these electrodes. Similarly, the potential ground electrodes 37 in Figs. 1 and 3, 42 in Fig. 4 and 56 and 60 in Fig. 5 may also be placed in the bore hole, though preferably separate from the housing 13 in the interest of stability.

Having in mind the disclosure in the above-mentioned copending application Serial No. 161,641, it will be understood that in Fig. 1 the potential may be measured at points other than the electrode $M_1$, such as the electrode $M_1'$, for example. Similarly, in Fig. 3, the potential may be measured at the electrode 38 instead of the electrode $A_0$.

Although a D. C. source of current has been shown in certain of the figures, while an A. C. source is shown in others and is preferred, either type of source may be employed in any of the embodiments disclosed, and the source may be lowered into the bore hole with the apparatus, if desired. Moreover, while a constant current source is preferred, variable intensity current sources may be used.

The specific embodiments described above are obviously susceptible of modification within the spirit of the invention. For example, servomechanism systems may be employed in place of the amplifiers shown for controlling the emission of current from an electrode to maintain the potential difference between spaced apart points substantially at zero. If desired, the current emission for this purpose may be adjusted manually. Also, the electrodes $M_1$, $M_1'$, $A_1$ and 38 need not be circular in shape, but may be rectangular or oval, for example. The invention, therefore, is not to be limited save as defined in the appended claims.

I claim:

1. A method for obtaining indications of the electrical resistivity of material in a thin layer immediately beneath the side wall of a bore hole drilled into the earth and containing a column of relatively conductive liquid, comprising the steps of disposing an electrode with its effective surface substantially parallel and in close proximity to the surface of the side wall of the bore hole, substantially completely blocking off direct electrical communication between the electrode and said liquid while affording electrical communication between the effective surface of the electrode and the adjacent formation material, passing electric current into the wall of the bore hole between said electrode and a reference point substantially at ground potential, thereby establishing a first electric field, establishing in the wall material about the electrode and in proximity thereto a second electric field having a polarity tending to reduce the potential difference attributable to said first field between points spaced different nearby distances from the electrode and electrically insulated from direct electrical communication with said liquid, adjusting the magnitude of said second electric field so as to reduce said potential difference substantially to zero, and obtaining indications of potential differences between a point substantially at ground potential and a point electrically insulated from direct electrical communication with said bore hole liquid and having substantially the same potential as one of said spaced points, and located in the vicinity of said spaced points.

2. A method for obtaining indications of the electrical resistivity of material in a thin layer immediately beneath the side wall of a bore hole drilled into the earth and containing a column of relatively conducting liquid, comprising the steps of disposing an electrode substantially against the surface of the side wall of the bore hole, passing electric current into the wall of the bore hole between said electrode and a reference point substantially at ground potential, thereby establishing a first electric field, excluding said liquid from direct electrical contact with the electrode, establishing in the wall material about the electrode and in proximity thereto a second electric field having a polarity tending to reduce the potential difference attributable to said first field between points spaced different nearby distances from the electrode and electrically insulated from direct electrical communication with said liquid, adjusting the magnitude of said electric field so as to reduce said potential difference substantially to zero, and obtaining indications of potential differences between a point substantially at ground potential and a point electrically insulated from direct electrical communication with said bore hole liquid and having substantially the same potential as, and located in the vicinity of said spaced points.

3. A method for determining the location of permeable formations traversed by a bore hole containing a column of relatively conductive liquid, comprising the steps of disposing an electrode substantially against the surface of the wall of the bore hole, excluding direct electrical contact between said conductive bore hole liquid and the electrode, passing alternating current and one other separably different form of electric current through the wall of the bore hole between said electrode and a reference point substantially at ground potential, thereby establishing first alternating electric fields of corresponding forms, respectively, establishing another electric field of the same form as one of said different forms of current in the formation about the electrode and in proximity thereof, said another field having a polarity tending to reduce the potential difference attributable to said first field of said one form between points spaced different nearby distances from said electrode and insulated from direct electrical communication with said liquid, controlling the magnitude of said another electric field so as to reduce said potential difference substantially to zero, obtaining indications of potential differences of said one form between a point substantially at ground potential and a point having substantially the same potential as, and located in the vicinity of said spaced points, and obtaining indications of potential differences associated with the other of said two forms of electric current between a point at a reference potential and a point near but spaced apart from said electrode.

4. A method for determining the location of permeable formations traversed by a bore hole containing a column of conducting liquid, comprising the steps of disposing an electrode substantially against the surface of and in electrical contact with the wall of the bore hole, passing alternating electric currents of two different frequencies through the wall of the bore hole between said electrode and a point at a reference potential, thereby establishing first electric fields of corresponding frequencies, respectively, excluding direct electrical contact between said conducting bore hole liquid and the electrode, establishing another electric field of the same frequency as one of said currents in the formation about the electrode and in proximity thereto, said another field having a phase tending to reduce the potential difference attributable to the first electric field of said one frequency between points spaced different nearby distances from said electrode and insulated from direct electrical communication with said bore hole liquid, controlling the magnitude of said another electric field so as to reduce said potential difference substantially to zero, obtaining indications of potential differences of said one frequency between a point substantially at ground potential and a point insulated from direct electrical communication with said bore hole liquid and having substantially the same potential as one of said spaced points and located in the vicinity of said spaced points, and obtaining indications of potential differences associated with current of the other said two frequencies between a point at a reference potential and a point near but spaced apart from said electrode.

5. Apparatus for obtaining indications of the electrical resistivity of material in a thin layer immediately beneath the side wall of a bore hole drilled into the earth and containing a column of relatively conductive liquid, comprising an electrode adapted to be lowered into the bore hole, means for urging said electrode into electrical communication with the wall of the bore hole, means for insulating said electrode from direct electrical communication with said bore hole fluid, a source of electrical energy connected to said electrode and to ground for establishing a first electric field, electrically energized auxiliary electrode means mounted in fixed relation to said electrode for establishing another electric field thereabout in the wall material of such magnitude and polarity as to reduce the potential difference between locations at different distances therefrom to a predetermined value, and means for providing indications of potential differences between a point in the vicinity of one of said locations and electrically insulated from direct electrical communication with said bore hole liquid and a point substantially at ground potential.

6. Apparatus for obtaining indications of the electrical resistivity of material in a thin layer immediately beneath the side wall of a bore hole drilled into the earth and containing a relatively conducting liquid, comprising first electrode means adapted to be lowered into the bore hole, means for urging said electrode means into electrical contact with the side wall of the bore hole, second electrode means mounted in fixed nearby relation to said first electrode means and having portions disposed therearound, means for excluding direct electrical contact between said first and second electrode means and said conducting fluid, an energizing circuit including said first electrode means for supplying electric current thereto and for establishing a first electric field, means including said second electrode means for establishing another electric field about said first electrode means of such magnitude and polarity as to reduce the potential difference between points spaced different distances from said first electrode means substantially to zero, and means for providing indications of potential differences between a point substantially at ground potential and a point having the same potential as one of said spaced points and located in the vicinity of said spaced points.

7. Apparatus for obtaining indications of the electrical resistivity of material in a thin layer immediately beneath the side wall of a bore hole drilled into the earth and containing a relatively conducting liquid, comprising first electrode means adapted to be lowered into the bore hole, second, third and fourth electrode means surrounding said first electrode means and spaced different distances therefrom, respectively, means for urging said first, second, third and fourth electrode means into electrical contact with the wall of the bore hole, insulating means for excluding said first, second, third and fourth electrode means from direct electrical contact with the bore hole liquid, a source of electric current connected to said first electrode means and to ground, amplifier means responsive to the potential difference between said second and third electrode means and connected to supply electric current to said fourth electrode means of such magnitude and polarity as to reduce said potential difference substantially to zero, and means for providing indications of potential difference between ground and a point at substantially the same potential as, and in the vicinity of one of said second and third electrode means.

8. Apparatus for obtaining indications of the electrical resistivity of material in a thin layer immediately beneath the side wall of a bore hole drilled into the earth and containing a column of conducting liquid, comprising first electrode means adapted to be lowered into a bore hole, second electrode means surrounding said first electrode means and movable therewith, means for urging said first and second electrode means into electrical engagement with the side wall of the bore hole, insulating means for excluding said bore hole liquid from direct electrical contact with said first and second electrode means, a source of electric current connected to said first electrode means and to ground, amplifier means responsive to the potential difference between said first and second electrode means and connected to supply current to said second electrode means of such magnitude and polarity as to reduce said potential difference substantially to zero and means for providing indications of potential difference between said first electrode means and ground.

9. Apparatus for obtaining indications of the electrical resistivity of material in a thin layer immediately beneath the side wall of a bore hole drilled into the earth and containing a relatively conducting liquid, comprising first electrode means adapted to be lowered into the bore hole, second electrode means surrounding said first electrode means and movable therewith, means for urging said first and second electrode means into electrical contact with the side wall of the bore hole, insulating means for excluding said bore hole liquid from direct electrical contact with said first and second electrode means, a relatively low electrical impedance connected between said first and second electrode means, a source of electric current at the surface connected to supply current to said second electrode means, and electrical indicating means responsive to the potential difference across said impedance and to the potential difference between said first electrode means and ground.

10. Apparatus for obtaining indications of the electrical resistivity of material in a thin layer immediately beneath the side wall of a bore hole drilled into the earth and containing a relatively conducting liquid comprising first electrode means adapted to be lowered into the bore hole, second, third and fourth electrode means surrounding said first electrode means and spaced different distances therefrom, respectively, means for urging said first, second, third and fourth electrode means into electrical contact with the wall of the bore hole, insulating means for excluding said first, second, third and fourth electrode means from direct electrical contact with the bore hole liquid, a plurality of sources of electrical energy connected to supply alternating currents of at least two different frequencies between said first electrode means and ground, amplifier means responsive to the potential difference of one of said frequencies between said second and third electrode means and connected to supply alternating current of said one frequency to said fourth electrode means and of such magnitude and phase as to reduce said potential difference substantially to zero, means for providing indications of potential difference of said one frequency between ground and a point at substantially the same potential as, and located in the vicinity of said second and third electrode means, and means for providing indications of the potential difference of the other of said frequencies between one of said second and third electrode means and a point at a reference potential.

11. In a method of electrical logging of formations traversed by a bore hole, the steps of establishing in earth formation near a location substantially against the side wall of the bore hole a first electric field radiating outwardly from said location into the adjacent earth formation, establishing in the vicinity of said location a second electric field having substantially rotational symmetry near said side wall of the bore hole about a direction running from said location away from said bore hole, and of such magnitude and polarity as to reduce to a predetermined value potential differences between points adjacent the said wall of the bore hole that are spaced different radial distances from said location, and obtaining indications of potential difference between a point adjacent said location and a reference point substantially at ground potential.

12. In a method of electrical logging of formations traversed by a bore hole, the steps of establishing a first electric field in earth formations near a location substantially against a side wall of the bore hole, establishing a second electric field in the vicinity of said location, adjusting the magnitude and polarity of said second electric field so as to produce a resultant electric field having substantially rotational symmetry near said side wall about a direction running from said location away from said bore hole, and obtaining indications of potential differences between a point adjacent said location and a reference point substantially at ground potential.

13. In well logging apparatus, the combination of a support adapted to be lowered into a well, a cushion member carried by said support and conformable to the wall of the well, means urging said cushion member laterally into engagement with the wall of a well, and a plurality of spaced concentric ring-like electrodes embedded in said cushion so as to be closely spaced apart from the wall of the well, said electrodes being electrically insulated from one another and having exposed outer faces opposite the wall of the well.

No references cited.